United States Patent

Blanding et al.

[11] Patent Number: 5,214,441
[45] Date of Patent: May 25, 1993

[54] METHOD AND APPARATUS FOR ALIGNMENT OF SCAN LINE OPTICS WITH TARGET MEDIUM USING EXTERNAL ADJUSTING MEMBERS

[75] Inventors: Douglass L. Blanding, Rochester; Michael E. Harrigan, Webster; David Kessler; Drew D. Summers, both of Rochester, all of N.Y.

[73] Assignee: Eastman Kodak Company, Rochester, N.Y.

[21] Appl. No.: 786,119

[22] Filed: Nov. 4, 1991

Related U.S. Application Data

[63] Continuation of Ser. No. 786,122, Oct. 31, 1991.

[51] Int. Cl.[5] .............................................. H04N 1/21
[52] U.S. Cl. ..................... 346/1.1; 346/108; 346/139 R
[58] Field of Search ..................... 346/1.1, 139 R, 108, 346/107 R, 76 L

[56] References Cited

U.S. PATENT DOCUMENTS

| | | |
|---|---|---|
| 3,922,060 | 11/1975 | Oosaka et al. . |
| 4,040,097 | 8/1977 | Mizuno . |
| 4,043,632 | 8/1977 | Jeffery et al. . |
| 4,239,326 | 12/1980 | Kramer . |
| 4,243,293 | 1/1981 | Kramer . |
| 4,297,713 | 10/1981 | Ichikawa et al. ................... 346/108 |
| 4,304,459 | 12/1981 | Kramer . |
| 4,397,521 | 8/1983 | Antos et al. . |
| 4,487,472 | 12/1984 | Asano . |
| 4,826,268 | 5/1989 | Kramer . |
| 4,904,034 | 2/1990 | Narayan et al. . |
| 4,928,119 | 5/1990 | Walker et al. ........................ 346/108 |

*Primary Examiner*—Mark J. Reinhart
*Attorney, Agent, or Firm*—Warren Locke Franz

[57] ABSTRACT

Positioning of a scan line (L) relative to a recording medium drum (15) of a polygon printer is established by independently adjusting blocks (35, 36) mounted on a scan line generating optics module (10) through adjustments made to an external beam sensing fixture (52). Inverted V-notches (38) used for nesting the blocks (35, 36) onto cylindrical surfaces of drum bearings (33) are nested onto corresponding cylindrical surfaces of fixture ends (54, 55). X, z, $\theta_x$ and $\theta_z$ positions are then set by x and z direction adjustment screws (44, 45, 49, 50) mounted on a support structure (73) to make adjustments in the fixture positions against the bias of springs (100). Clamping screws (45, 46) pass through oversized holes (47, 48) on blocks (35, 36) to releasably lock blocks (35, 36) after adjustment. The z direction adjustment includes levers (85) and dual ball socket assemblies (95, 96, 97) so that adjustment of the $\theta_y$ position of fixture (52) will simultaneously occur to maintain a constant angle of incidence during adjustment, in response to the travel of a wheeled member (60) against a constant radius frame surface (70).

16 Claims, 3 Drawing Sheets

METHOD AND APPARATUS FOR ALIGNMENT OF SCAN LINE OPTICS WITH TARGET MEDIUM USING EXTERNAL ADJUSTING MEMBERS

This is a continuation of U.S. patent application Ser. No. 07/786,122, filed Oct. 31, 1991, entitled "METHOD AND APPARATUS FOR ALIGNMENT OF SCAN LINE OPTICS WITH TARGET MEDIUM USING EXTERNAL ADJUSTING MEMBERS."

TECHNICAL FIELD

This invention relates generally to a method and apparatus for accurately positioning scan line generating optics relative to an intended scan line receiving target medium; and, in particular, to a "drop-in" optics module for a polygon printer or the like, settable using external adjustment means, for accurately locating the generated scan line relative to a photosensitive recording medium carried on a rotating drum.

BACKGROUND ART

The positioning of a raster scan line, like that generated by the optics of a polygon laser printer such as shown in U.S. patent application Ser. No. 07/637,429, filed Jan. 4, 1991, onto an x-ray film or other photosensitive image recording medium involves assuring accurate alignment in the x (cross-scan), y (scan) and z (beam path) translational directions, as well as the $\theta_x$, $\theta_y$ and $\theta_z$ rotational directions respectively about each of the x, y and z directions. Proper positioning also requires attainment of the right angle of incidence of the beam onto the target medium.

Excessive focal shift errors of the scan line with respect to the recording medium can lead to a printing artifact called banding. Banding is an undesirable periodic density modulation in the image that is most noticeable in uniform density regions. A very high degree of accuracy of scan line placement is required especially for laser printers used for x-ray films, because banding artifacts can lead to false diagnoses. The eye is very sensitive to low frequency (1–8 cycles/degree) contrast modulation, having a threshold as low as 0.2% under the right illumination conditions. The design goal typically will use half this tolerance, so it will have 0.1% allowable line shift for the extreme polygon facet error. For a printer with a line pitch of 0.08 mm, the allowable error is thus only $80 \times 10^{-9}$ mm. This requirement means that only a very small focus error can be present for the page cross section of the beam.

Antos et al. U.S. Pat. No. 4,397,521 discloses a polygon raster scanner having a pair of adjustable screws which cooperate with a leaf spring to precisely aim a laser beam toward the optical system. Jeffery et al. U.S. Pat. No. 4,043,632 discloses a polygon mirror with adjustable facets. Kramer U.S. Pat. No. 4,826,268 discusses banding in a hologon scanner. Oosaka et al. U. S. Pat. No. 3,922,060 discloses the use of slidable "v" pads for accurate motion of a movable stage for an optical bench in hologram recorder. Other patents describing related subject matter include the following U.S. Pat. Nos. 4,040,097, 4,239,326; 4,243,293; 4,304,459; 4,487,472; and 4,904,034.

Scan line generating optics systems are susceptible to two types of focusing errors: those which cause deviations of the scan curve from a straight line; and those which displace the scan line from its intended generatrix line on the target drum The f-$\theta$ condition correcting and other optical elements can be manufactured with sufficiently tight tolerances and alignment procedures to ensure the generation of an acceptably straight (i.e. non-arcuate) scan line in space.

U.S. patent application Ser. No. 07/785,346, filed Oct. 31, 1991, discloses a novel method and apparatus for ensuring the proper placement of a scan line generated by the optics of a polygon laser printer onto a recording medium supported on a rotating drum. An inexpensive mechanism is provided for adjustably setting the x, z, $\theta_x$, $\theta_z$ and angle of incidence positioning of the scan line. Beam source, shaping and scanning optics are mounted on a rigid module and adjustable means is provided to mechanically rigidly connect the optics module to the drum. In a preferred embodiment described in the '346 application, the connection is provided by two inverted V-notched blocks that are selectively positionable relative to the module frame and which are brought into nesting relationship onto cylindrical surfaces of bearings mounted coaxially with the drum shaft. Positioning of the blocks is controlled by adjustment screws and springs located on the module itself, with adjustments made utilizing a drum simulating external quad cell device.

Utilizing wholly on-board means for adjusting the notched blocks relative to the optics module introduces unnecessary complexity into the construction of the optics module frame. Moreover, having all block adjustment elements included with each module requires unnecessary duplicity or parts, not normally required on site after installation on a particular printer drum is complete.

DISCLOSURE OF THE INVENTION

It is an object of the present invention to provide an improved method and apparatus for ensuring the proper placement of a scan line generated by the optics of a polygon laser printer or the like onto a recording medium mounted on a rotating drum or other target medium supporting mechanism.

It is a further object of the invention to provide an inexpensive mechanism, utilizing off-board elements, for adjustably setting the x, z, $\theta_x$, $\theta_z$ and angle of incidence positioning, relative to a recording medium supported on a rotating drum, of a scan line generating optics module of a polygon printer.

In accordance with one aspect of the invention, beam source, shaping and scanning optics of a polygon printer are mounted on a rigid module and arranged to generate a raster scan line in space. An adjustable connection is provided to mechanically rigidly connect a frame of the optics module relative to a printer target drum. Off-board means are provided to set the adjustable connection so that the generated scan line is accurately placed onto a recording medium supported for scanning on the drum. In a preferred embodiment, described in greater detail below, an adjustable connection is provided by two inverted V-notched blocks that are selectively positionable relative to the module frame and which are brought into nesting relationship onto cylindrical surfaces of bearings mounted coaxially with the drum shaft. A drum-simulating quad cell fixture, selectively positionable utilizing means external to the optics module, is used to set the x and z direction positions of the blocks relative to the module frame and to each other, in order to set the x, z, $\theta_x$ and $\theta_z$ directional positioning of the module-generated scan line relative to the drum.

BRIEF DESCRIPTION OF THE DRAWINGS

Embodiments of the invention have been chosen for purposes of illustration and description, and are shown with reference to the accompanying drawings, wherein.

Throughout the drawings, like elements are referred to by like numerals.

MODES OF CARRYING OUT THE INVENTION

The principles of the invention are illustrated with reference to an exemplary implementation of apparatus suitable for proper positioning of the optics of a polygon printer relative to a photosensitive medium, such as an x-ray film mounted for line-to-line advancement on the cylindrical surface a rotating drum.

Figure 1:
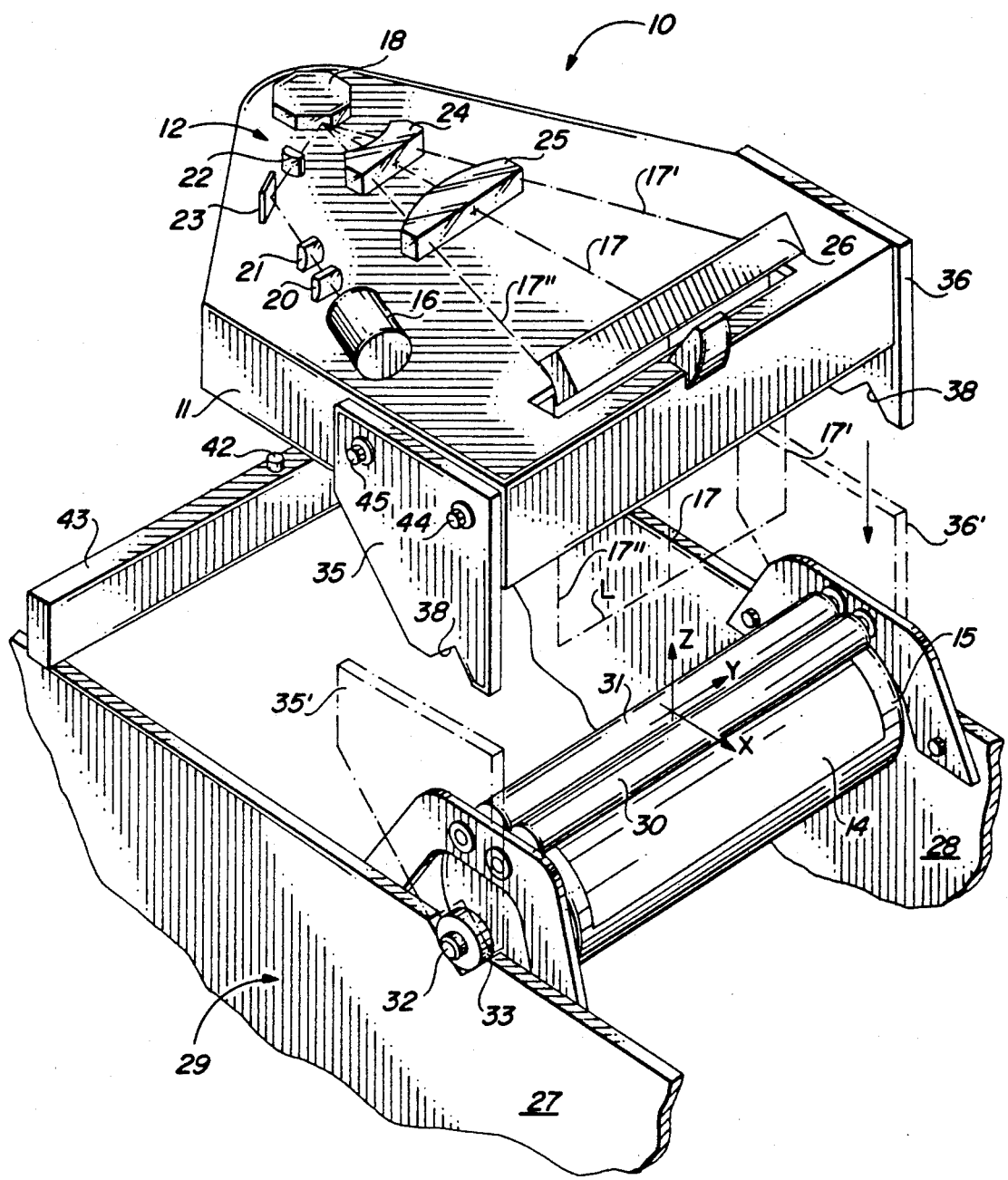
FIG. 1 is an exploded perspective view of a drop-in optics module in accordance with the invention employed with a printer having a rotating drum.
Figure 2:
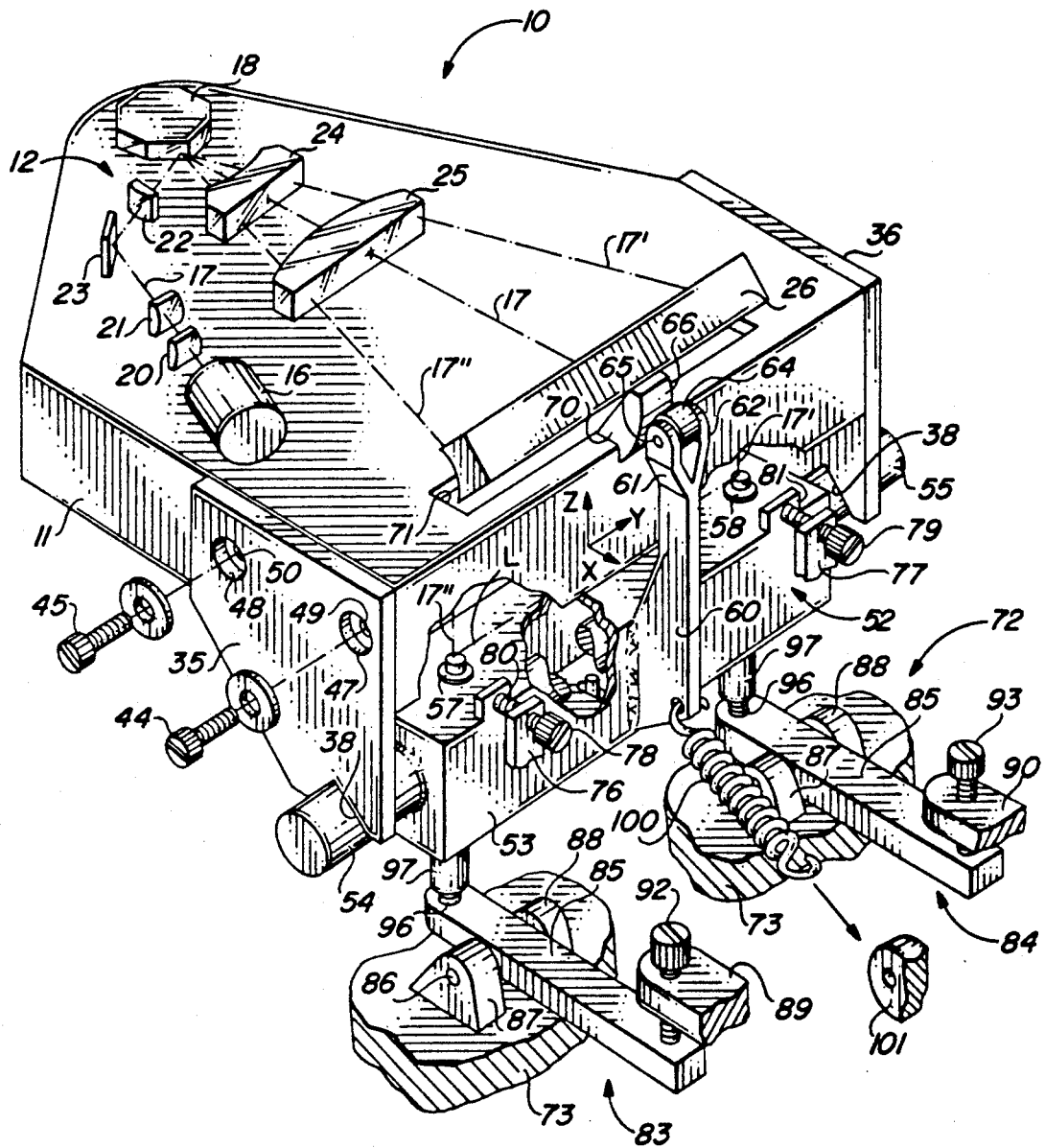
FIG. 2 is a perspective view of the optics module of FIG. 1, shown in place on a fixture usable for making positional adjustments.
Figure 3:
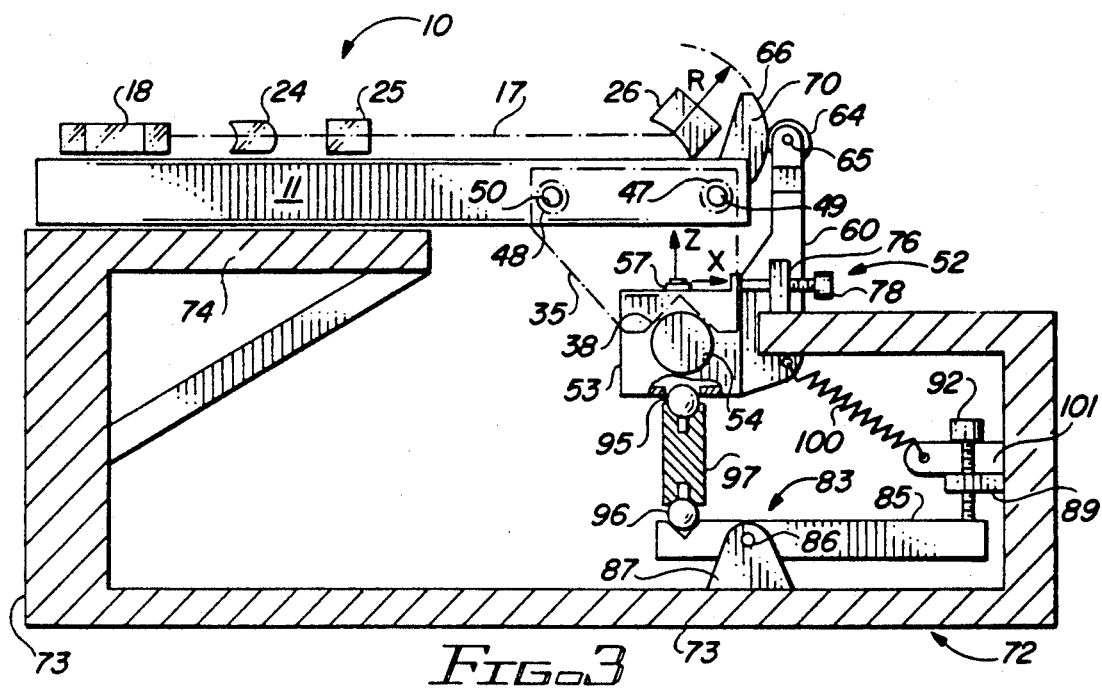
FIG. 3 is a side view, with parts shown in phantom and section, of the module and fixture of FIG. 2.

As shown in FIGS. 1–3, a drop-in optics module 10 comprises a rigid frame 11 on an upper surface of which are fixed, in typical arrangement, the elements of an optical system 12 suitable for generating a laser beam along a z (beam path or focus) direction, and scanning the same along a line L in the y (scan or page width) direction onto a film or similar medium 14. The medium 14 is supported for movement in an x (cross-scan or page length) direction on the outside cylindrical surface of a rotatable drum 15 (FIG. 1). The optical system 12 is configured to assure that the generated scan line L will be sufficiently straight for the intended printing purposes, and means are provided in accordance with the invention, as further described below, for adjustably rigidly mechanically connecting the module 10 and the drum 15 to achieve proper placement of the scan line L onto the medium 14.

In accordance with well-known principles, the optical system 12 includes an optical head 16 for projecting the beam of laser light along an optical beam path 17 (dot-dashed lines) coincident with the z direction. The beam 17 is modulated in accordance with information received from an image signal generating circuit (not shown), and scanned line-by-line in the y direction (from 17' to 17") onto the medium 14 by means of a rotating polygon 18. A start-of-scan detector (not shown) controls the timing of the light beam modulation. Optical elements, comprising lenses 20, 21, 22 and folding mirror 23, control the shape, focus and path of the beam 17 between the optical head 16 and mirrored multiple facets of the polygon 18. Optical elements, comprising lenses 24, 25 and mirror 26 located between polygon 18 and drum 15, correct for differences in beam focus in the y direction due the f-$\theta$ condition and correct for displacements of the image in the x direction due to pyramid facet out-of-plane wobble and angle errors. The invention is directed at eliminating focal errors that may occur due to misplacement of the optics generated scan line L, and is an improvement over the embodiments described in U.S. patent application Ser. No. 07/785,346, filed Oct. 31, 1991. The addresses are those due to deviations from normal (or other desired) angle of incidence of beam 17 with the recording medium 14; and those due to misplacement in the $\theta_x$ and $\theta_z$ rotational and x and z translational directions of the delivered scan line from its intended placement on the recording medium 14. The improvement over the embodiments disclosed in the '346 application resides in the means employed to make the error correcting adjustments.

The drum 15 is mounted on shaft 32, journalled for rotation between opposing walls 27, 28 of the printer body 29 (FIG. 1). Pressure rollers 30, 31 are rotatably supported in spaced alignment between the same walls 27, 28, to ride along the cylindrical surface of drum 15 for the purpose of holding the medium 14 against the drum 15 on either side of the scan line L. Left and right ends of the drum shaft 32 have bearings 33 which provide cylindrical reference surfaces for receiving the adjustable mechanical connection between the frame 11 and the drum 15.

As shown in FIGS. 1–3, the depicted mechanical connection has two x-z planar mounting blocks or plates 35, 36 which depend vertically, respectively from left and right sides of a front portion of the frame 11. Each block 35, 36 includes a lower end having an upwardly-directed, inverted V-notch 38 of isosceles triangular shape having an interior angle of 90°. The notches 38 are dimensioned, configured and adapted to be received in two-point tangential abutment over the cylindrical surfaces of the respective bearings 33, as illustrated by the dot-dot-dashed positions 35', 36' of blocks 35, 36 in FIG. 1. The downward extensions or z directional positions of blocks 35, 36 relative to frame 11 act to establish the z and $\theta_x$ directional positions of frame 11 relative to the drum 15 and medium 14. The x directional positions of the blocks 35, 36 relative to the frame 11 act to establish the x and $\theta_z$ directional positions of frame 11 relative to the drum 15 and medium 14. The undersurface at the rear of frame 11 rests on an upwardly projecting locator pin 42 positioned under polygon 18 on a beam 43 which connects the printer walls 27, 28. Beam 43 serves as a stop, when blocks 35, 36 are nested on bearings 33, to prevent rotation of the frame 11 due to the moment of the weight of the rear of frame 11 acting about the rotational axis of shaft 32. The undersurface of the frame 11 rests on the end of pin 42 to establish the $\theta_y$ directional position of the frame 11 relative to the drum 15 and medium 14.

In order to make the x, z, $\theta_x$, $\theta_z$ positioning of frame 11 relative to the medium 14 adjustable, the blocks 35, 36 are made selectively independently adjustable in the x and z directions relative to frame 11. As shown, laterally-spaced, front and rear y direction clamping screws 44, 45 are respectively passed through oversized holes 47, 48 of blocks 35, 36 into threaded engagement with y direction bores 49, 50 formed in frame 11 (see FIGS. 2 and 3). Holes 47, 48 are oversized to permit shifting of blocks 35, 36 in both x and z directions relative to the shanks of the screws 44, 45 that pass therethrough.

The mechanical connection established by blocks 35, 36 between the scan optics frame 11 and the drum 15 provides a short and stiff rigid mounting. The weight of the frame 11 will cause the notches 38 to nest against the bearings 33 and the rear of frame 11 at pin 42 to nest against the beam 43, to constrain the module 10 in x, z, $\theta_x$, $\theta_y$, $\theta_z$ directions. Constraint of module 10 in the y direction can be provided by any suitable means, such as a notch-to-pin constraint like that disclosed in the '346 application. Spring clips (not shown) connected between the frame 11 or blocks 35, 36 and the printer body 29 can be used to augment the nesting force.

The procedure for accurately positioning the scan line L generated by the optics system 12 relative to the scan line receiving medium 14 can be understood with reference to FIGS. 2-4B. For setting the positions of blocks 35, 36 relative to frame 11, an alignment fixture 52 (FIGS. 2 and 3) is utilized to simulate the drum 15. The fixture 52 comprises a rectangular cross-sectioned body member 53 connecting two coaxially-aligned cylindrical ends 54, 55 which have cylindrical surfaces of the same diameter as drum bearings 33. A plurality of light beam sensors, such as an arrangement of two quad cells 57, 58, are located on an upper surface of body member 66 intermediate the ends 54, 55 in radially facing positions, in line with the coaxial axes of ends 54, 55. For the two quad cell arrangement shown, the quad cells 57, 58 are spaced radially from the axes of ends 54, 55 by a distance equal to the radius of drum 15 plus the thickness of the recording medium 14. The quad cells 57, 58 are spaced longitudinally from each other by a distance preferably corresponding to 70-100% of the width of the scan line L (i.e. the distance between beam positions 17' and 17"). Additional quad cells may be employed.

The fixture 52 is oriented with the axes of ends 54, 55 aligned with the y direction. An upwardly-extending bifurcated member 60 positioned centrally of the body 53 has spaced arms 61, 62 between which is located a wheel 64 journalled for rotation about a pin 65 extending in the y direction. The member 60 is dimensioned, configured and adapted to locate the rolling surface of wheel 64 in contact with a cylindrical surface 66 coincident with an arc of radius R (FIG. 3) drawn in the $\theta_y$ direction about a point centrally located on the reflective surface of mirror 26. The wheel 64 cooperates with the surface 66 so that rotation of the body member 53 in the $\theta_y$ direction, while maintaining contact of wheel 64 with surface 66, will keep the quad cells 57, 58 always pointed to receive the beam 17 with the same angle of incidence. For the illustrated radial orientation of the quad cells 57, 58 relative to the ends 54, 55 of the fixture 52, that angle of incidence will always be normal to the drum 15 surface. (It will, of course, be appreciated by those skilled in the art that the fixture 52 can be configured to maintain an angle of incidence that is constant at an angle other than normal.) The arced surface 66 is conveniently provided on an upward extension 70 formed at the front of the frame 11, ahead of the mirror 26 and downward beam path opening 71 (FIG. 2).

For setting the positioning of the blocks 35, 36 (and, thus, the positioning of fixture 52) relative to the frame 11, an adjustment assembly 72 is provided. As shown in FIGS. 2 and 3, the assembly 72 comprises a support structure 73 having mean for holding frame 11 fixed in stationary position during the positioning adjustment procedure. For the illustrated embodiment, this is done by providing a horizontally planar platform 74 in elevated position at the rear of structure 73, on which frame 11 can be supported with blocks 35, 36 depending freely therefrom. At the front of structure 73, lobes 76, 77 (FIG. 2) are located in general alignment with the positions of quad cells 57, 58. X direction adjustment screws 78, 79 are threaded through x direction bores of lobes 76, 77 so that free end tips of the screws 78, 79 abut rear surfaces of upwardly extending lobes 80, 81 formed on the fixture body 53.

The structure 73 also includes two spaced lever assemblies 83, 84 for z direction adjustment. The assemblies 83, 84 are respectively located in x and z alignment with the quad cells 57, 58. Each assembly 83, 84 comprises a lever arm 85 oriented in the x direction and being mounted for $\theta_y$ rotation about a y direction pin 86 supported between opposed pillars 87, 88 of a yoke attached to the support 73. Lobes 89, 90 of structure 73 project rearwardly over the front ends of arms 85, and z direction adjusting screws 92, 93 thread through z direction bores of lobes 89, 90 so that their free end tips respectively abut the top surfaces of the front ends of the arms 85. Double-ball socket arrangements comprising spherical elements 95, 96 respectively received within rounded sockets at opposite ends of a vertically extending spacer 97, connect the back end upper surfaces of arms 85 with the underside of body member 53 of fixture 52. Element 95 is received between the upper end socket of spacer 97 and a corresponding socket located on body 53 in radial alignment with quad cell 57 or 58. Element 96 is received between the socket of the lower end of spacer 97 and a corresponding socket formed in z direction alignment between the mirror 26 and the front end of arm 85 at the location of quad cell 57 or 58. Biasing of the lobes 80, 81 against the tips of screws 78, 79 is provided by the x direction component of a spring 100 that extends between a lower end of the bifurcated member 60 at the lower front of body member 53 and a spring anchoring post 101 formed below and forwardly on the structure 73. The z direction component of the same spring acts to bias the front ends of arms 85 upwardly against the tips of z direction adjustment screws 92, 93.

The frame 11, with blocks 35, 36 attached, is placed over the adjustment assembly 72. The clamping screws 56, 57 are loosened, causing the blocks 35, 36 to engage the fixture 52, with notches 38 brought into two-point tangential contact with the cylindrical surfaces of the fixture ends 54, 55. The initial positioning of the blocks 35, 36 is determined by the initial positioning of the fixture 52 supported by the double-ball and socket connections with arms 85. The z direction component of spring 100 urges the top surfaces of the front ends of arms 85 into contact with the tips of z direction adjustment screws 92, 93. The x direction component of spring 100 urges the front surfaces of lobes 80, 82 into contact with the tips of the x direction adjustment screws 78, 79. The same spring 100 also urges the wheel 64 of fixture 52 into rolling contact with the forwardly projecting arcuate surface 66 of upward extension 70 of frame 11.

Figures 4A, 4B:
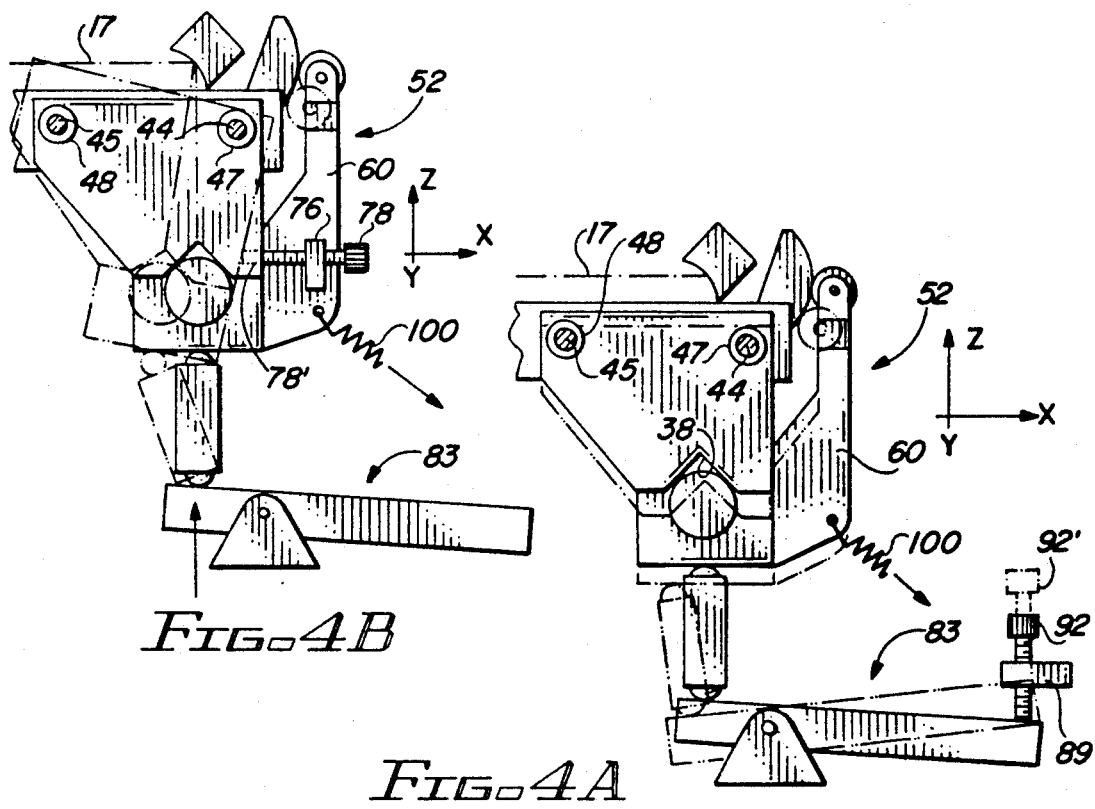
FIGS. 4A and 4B are partial schematic side views of the module and fixture of FIG. 2, helpful in understanding the positional adjustment operation.

As shown in FIG. 4A, to change the z position of block 35 relative to frame 11, screw 92 is moved in the z direction within lobe 89 toward or away from the top surface of the end of arm 85, to a position 92' (from solid to dot-dot-front dashed position). This movement causes a like change in the opposite direction of the z direction position of the back end of arm 85 which moves the quad cell 57 by a corresponding amount relative to the end 17" of scan line L (representing the same change of end 17" relative to one edge of the medium 14). Similarly, to change the z position of block 36 relative to frame 11, screw 93 is moved in the z direction within lobe 90 toward or away from the top surface of the front end of its corresponding arm 85. This movement causes a corresponding change in the z position of quad cell 58 relative to the end 17' of scan line L (representing the same change of 17' relative to the medium 14). The same screws 92, 93, thus, set the z direction position of scan line L relative to the medium 14 and, to the extent that the z direction adjustment of one block 35, 36 is different from that of the other block 35, 36, also set the $\theta_x$ position of scan line L relative to the medium 14.

As shown in FIG. 4B, movement of screw 78 within the lobe 76 in the x direction toward or away from the front surface of lobe 80 of fixture 52 changes the x position of the block 35 relative to frame 11 according to the change made in the x position of the quad cell 57 relative to the end 17" of scan line L (representing the same change in position of end 17" relative to the medium 14). Similarly, movement of screw 79 within the lobe 77 in the x direction toward or away from the front surface of lobe 81 of fixture 52 changes the x position of block 36 relative to frame 11 according to the change made in x position of the quad cell 58 relative to the end 17' of scan line L (representing the same change in position of end 17' relative to the medium 14). The screws 44, 45, thus, set the x direction position of scan line L relative to the medium 14 and, to the extent that the x direction adjustment of one block 35, 36 is different from that of the other block 35, 36, also set the $\theta_z$ position of scan line L relative to medium 14.

The rolling contact of wheel 64 with the arcuate surface 66, along with the movement flexibility provided by the double ball and socket connections between the arms 85 and the body 53, ensures that the angle of incidence of the beam 17 will remain the same (i.e., radial to the drum 15 and normal to the medium 14) for changes in the x positioning. The angular orientation is maintained because contact of wheel 64 with arcuate surface 66 is maintained, thereby rotating the radial orientation of quad cells 57, 58 about the radius R origin line on mirror 26. The constant radial orientation acts so that the rotation of fixture 52, with changes in x direction positioning, keeps the angle of incidence of beam 17 the same.

Once the independent settings of screws 78, 79, 90, 91 have been made, thereby establishing the x, z, $\theta_x$, $\theta_z$ positional relationships between the scan line L and the medium 14, the clamping screws 45, 46 are tightened to lock the blocks 35, 36 in their selectively adjusted positions relative to frame 11. Because of the simulation of the drum 15 by the fixture 52, these positional relationships will be maintained when the drop-in optics module 10 is subsequently mounted on the bearings 33 of the printer. The bearings 33 are arranged relative to the shaft 32 to have a spacing corresponding to the spacing of the blocks 35, 36 relative to the frame 11. As mentioned above, the beam 43 acts as a stop to prevent $\theta_y$ rotation of the frame 11 about the drum shaft 32. The y positioning of scan line L relative to the medium 14 can be controlled by means of the end-of-scan sensor, so is not that critical.

Those skilled in the art to which the invention relates will appreciate that other substitutions and modifications can be made to the described embodiment without departing from the spirit and scope of the invention as described by the claims below.

We claim:

1. A method for positioning an optical system relative to a scan line receiving medium in a printer, or the like; the optical system being mounted on a frame and being suitable for generating a beam along a z (beam path) direction and scanning the same along a scan line in a y (scan) direction; and the receiving medium being supported for movement in an x (cross-scan) direction on the printer; and the method comprising the steps of:

providing two curved surfaces on the printer;
   providing two blocks attached to the frame, the blocks having upwardly-directed, inverted V-notches;
   providing an alignment fixture having two curved surfaces, relatively dimensioned, configured and adapted to correspond to the printer curved surfaces, and having a beam receiving elements dimensioned, configured and adapted relative to the fixture curved surfaces to correspond to the position of the receiving medium relative to the printer curved surfaces;
   placing the frame, with the blocks attached, onto the fixture with the block notches brought over the fixture curved surfaces;
   selectively adjusting the positions of the blocks relative to the frame to establish a positional relationship between the scan line and the beam receiving element, corresponding to a desired positional relationship between the scan line and the receiving medium;
   locking the blocks in their selectively adjusted positions relative to the frame; and
   placing the frame, with the blocks locked, onto the printer, with the block notches brought over the printer curved surfaces;
   the method being characterized in that:
   the placing the frame onto the fixture step further comprises holding the frame fixed in a stationary position; and
   the selectively adjusting step comprises selectively adjusting the positions of the blocks relative to the frame by selectively adjusting the position of the fixture relative to the frame using means external to the frame, with the frame held fixed in the stationary position.

2. A method as in claim 1, wherein the selectively adjusting step comprises selectively independently adjusting the x and z direction positions of the fixture relative to the frame, to establish the relationship between the scan line and the beam receiving element in $\theta_x$ and $\theta_z$ rotational directions, as well as in the x and z directions.

3. A method as in claim 1, wherein the selectively adjusting step comprises selectively adjusting the position of the fixtures, while maintaining a constant angle of incidence of the scan line generating beam relative to the beam receiving element.

4. A method as in claim 1, wherein the blocks locking step comprises locking the blocks using clamping screws having that pass through holes in the blocks and into engagement with the frame, the holes being oversized relative to the shanks.

5. A method for positioning an optical system relative to a scan line receiving medium in a printer, or the like; the optical system being mounted on a frame having a front and a rear, and being suitable for generating a beam along a z (beam path) direction and including a rotating polygon for scanning the same along a scan line in a y (scan) direction; the receiving medium being supported for movement in an x (cross-scan) direction on an outside cylindrical surface of a rotatable drum on the printer; and the method comprising the steps of:

providing two cylindrical surfaces on the printer on opposite ends of the drum;

providing two blocks mounted to depend in x-z planar positions from opposite sides of the front of the frame, the blocks having upwardly-directed, inverted V-notches;

providing an alignment fixture having two end cylindrical surfaces, relatively dimensioned, configured and adapted to correspond to the printer cylindrical surfaces; and having an intermediate portion with a plurality of beam receiving elements aligned in the y direction, the beam receiving elements being dimensioned, configured and adapted relative to the fixture cylindrical surfaces to correspond to the position of the receiving medium relative to the printer cylindrical surfaces;

placing the frame, with the blocks attached, onto the fixture with the block notches brought into two-point tangential abutment over the fixture cylindrical surfaces;

selectively independently adjusting the x and z positions of the blocks relative to the frame to establish x, z, $\theta_x$ and $\theta_z$ positional relationships between the scan line and the beam receiving elements, corresponding to desired x, z, 0″ and 0, positional relationships between the scan line and the receiving medium;

locking the blocks in their selectively independently adjusted positions relative to the frame; and placing the frame, with the blocks locked, onto the printer, with the block notches brought into two-point tangential abutment over the printer cylindrical surfaces;

the method being characterized in that:

the placing the frame onto the fixture step comprises holding the rear of the frame fixed in a stationary position; and the selectively independently adjusting step comprises selectively independently adjusting the positions of the blocks relative to the frame by selectively adjusting the position of the fixture relative to the frame using means external to the frame, with the frame held fixed in the stationary position.

6. A method as in claim 5, wherein the selectively adjusting step comprises selectively independently adjusting the x and z positions of the fixtures, while maintaining a constant angle of incidence of the scan line generating beam relative to the beam receiving element.

7. A method as in claim 6, wherein the method further comprises providing a support structure and two x direction adjustment elements mounted on the support structure; and the selectively independently adjusting step comprises selectively independently moving the respective x direction adjustment elements against the fixture.

8. A method as in claim 7, wherein the support structure providing step further comprises providing two z direction adjustment elements mounted on the support structure; and the selectively independently adjusting step further comprises selectively independently moving the respective z direction adjustment elements against the fixture.

9. A method as in claim 8, wherein the support structure providing step further comprises providing means or biasing the fixture against the x and z direction adjustment elements; and the selectively independently adjusting step comprises selectively independently moving the respective x and z direction adjustment elements against the fixture against the bias of the biasing means.

10. A method as in claim 9, wherein the step of providing means for biasing the fixture against the x and z direction adjustment elements comprises providing a spring connected between the fixture and support structure for asserting a biasing force having components in both the x and z directions.

11. A method as in claim 8, wherein the plurality of beam receiving elements comprises two sensors; and the x and y direction adjustment elements are moved against the fixture at locations respectively proximate the two sensors.

12. A method as in claim 11, wherein the x direction adjustment elements comprise x direction adjustment screws; and the z direction adjustment elements comprise z direction adjustment screws and lever elements connected between the z direction adjustment screws and the fixture.

13. A method as in claim 12, wherein the lever elements comprise levers having opposite ends, portions intermediate the opposite ends mounted on the support structure for pivotal movement about a y direction axis; and double-ball socket assemblies located between the fixture and ones of the lever opposite ends; and the z direction adjustment screws are moved against others of the lever opposite ends to pivot the levers about the y direction axis, to adjust the fixture positions by movement of the double-ball socket assemblies.

14. A method as in claim 13, wherein the method further comprises providing the frame with a curved surface; and providing a wheeled member on the fixture, biased into contact with the frame curved surface when the notches are received in two-point tangential abutment onto the fixture cylindrical surfaces; and the selectively independently adjusting step further comprises selectively independently adjusting the position of the fixture relative to the frame, using the wheel contact with the frame curved surface to maintain a constant angle of incidence of the scan line generating beam onto the sensors.

15. A method as in claim 14, wherein the wheeled member is provided to extend upwardly, centrally of the fixture; and the frame curved surface provided is an arc having a curvature centered about a point located on the optical system.

16. A method for positioning an optical system relative to a printer, or the like; the optical system being suitable for generating a beam along a z (beam path) direction and scanning the same along a scan line in a y (scan) direction; and the printer including means for supporting a scan line receiving medium for movement of the receiving medium in an x (cross-scan) direction on the printer; the method being characterized in that it comprises the steps of:

mounting the optical system on a frame;

providing two blocks attached to the frame, the blocks extending in the z direction from the frame, and being located at opposite ends of the generated scan line;

providing two block-receiving surfaces on the printer, the surfaces being located on opposite sides of the receiving medium supporting means;

providing an alignment fixture having two block-receiving surfaces relatively dimensioned, configured and adapted to correspond to the printer block-receiving surfaces, and having a beam receiving element dimensioned, configured and adapted relative to the fixture block-receiving surfaces to correspond to the position in which the receiving medium is supported relative to the printer block-receiving surfaces by the receiving medium supporting means;

placing the frame, with the blocks attached, onto the fixture with the blocks brought over the fixture block-receiving surfaces;

selectively adjusting the positions of the blocks relative to the frame to establish a positional relationship between the scan line and the beam receiving element, corresponding to a desired positional relationship between the scan line and the receiving medium;

locking the blocks in their selectively adjusted positions relative to the frame; and placing the frame, with the blocks locked, onto the printer, with the blocks brought over the printer block-receiving surfaces.

* * * * *